Jan. 15, 1952    A. D. ROSE    2,582,758
FISHING LINE SNAP ACTUATOR
Filed April 26, 1950

INVENTOR.
Archie D. Rose
BY Victor J. Evans & Co.
ATTORNEYS

Patented Jan. 15, 1952

2,582,758

UNITED STATES PATENT OFFICE 2,582,758

FISHING LINE SNAP ACTUATOR

Archie D. Rose, Laramie, Wyo.

Application April 26, 1950, Serial No. 158,178

4 Claims. (Cl. 43—15)

This invention relates to fishing tackle, and in particular a spring actuated snap action incorporated in a fishing line whereby as a fish strikes a hook extended from one end thereof a trip holding a spring therein is released whereby the spring draws the hook away from the fish with a snap action so that the fish is positively hooked thereby.

The purpose of this invention is to provide means for instantly actuating a fish hook to secure a fish on the hook as soon as the fish strikes or endeavors to remove bait from the hook.

Various devices have been provided for mechanically actuating fish hooks and also for attaching hooks to fishing lines through yielding elements but it has been found difficult to provide a comparatively small device that actuates a hook with a snap action that may be installed in the fishing line close to the hook without scaring the fish away from the bait.

The object of this invention is, therefore, to provide a snap action for fish hooks that may be incorporated in a fishing line just ahead of the hook.

Another object of the invention is to provide a fish hook snap actuator in which an operating spring is released by a slight pull of a fish on a hook.

A further object of the invention is to provide a snap actuator for fish hooks which is of a simple and economical construction.

With these and other objects and advantages in view the invention embodies an elongated tubular casing having openings in the sides thereof, a cylinder having a conical shaped end slidably mounted in the casing and having gripping means thereon, a plunger positioned in the cylinder, and a spring attached to the cylinder and an end of the tubular casing.

Other features and advantages of the invention will appear from the following description taken in connection with the drawings wherein.

Figure 1:
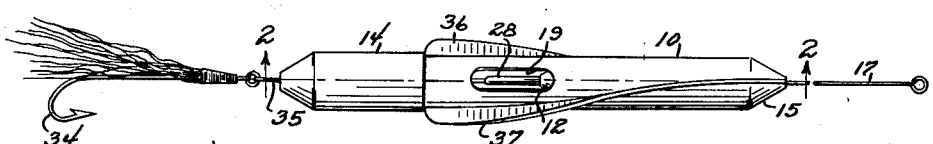
Figure 1 is a side elevational view illustrating the fish hook actuator with the parts assembled.

Referring now to the drawings wherein like reference characters denote corresponding parts the improved fish hook actuator of this invention is formed with an elongated tubular casing 10, an inner cylinder 11, a plunger 12, a spring 13 and a cap 14.

Figure 3:
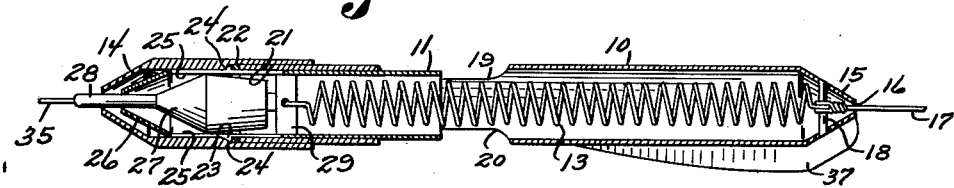
Figure 3 is a similar view showing the spring extended.
Figure 4:
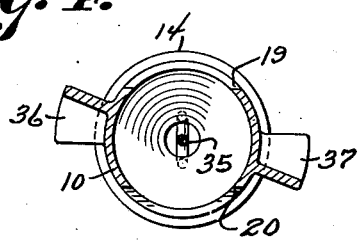
Figure 4 is a cross section through the actuator taken on line 4—4 of Figure 2.

The tubular casing 10, which is preferably made of plastic is provided with a conical shaped inner end 15 having an opening 16, for a fishing line 17, therein, and a transversely disposed pin 18 is extended across the conical shaped end, as shown in Figure 3, which provides means for holding the inner end of the spring 13 and also for holding the fishing line or leader as indicated by the numeral 17.

The intermediate part of the tubular casing 10 is provided with recessed sections 19 and 20 forming openings in the sides of the casing through which the cylinder 11 may be gripped by the thumb and forefinger of a hand to facilitate setting the actuator.

The opposite or outer end of the cylindrical casing extends into an annular recess 21 in the cap 14 and with the parts formed of plastic the parts may be secured together by a suitable solvent, or with the parts formed of other materials the cap may be secured to the casing by welding or other means.

A ring 22 is positioned in the recess 21 at the end of the casing 10 and between the end of the casing and a shoulder 23 in the cap.

Figure 2:
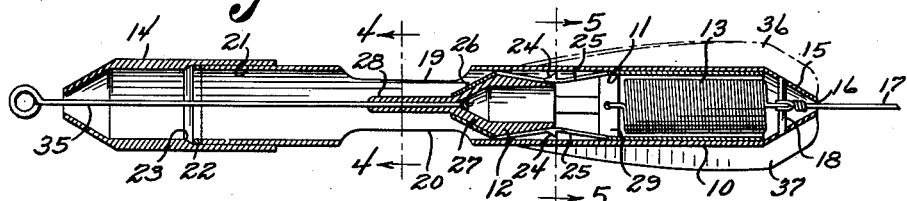
Figure 2 is a longitudinal section through the actuator taken on line 2—2 of Figure 1 and showing the spring in the contracted position.

The ring 22, which may be formed of metal or other suitable material is positioned to be engaged by gripping dogs 24 on spring strips 25 of the cylinder 11 with the spring strips expanded by the plunger 12, as illustrated in Figure 3. The cylinder 11 is provided with a conical shaped end 26, and a similarly shaped end 27 is provided on the plunger and positioned to nest in the end of the cylinder, as shown in Figure 2. The body of the plunger is provided with a tapering outer surface and a stem 28 extends from the opposite or conical shaped end.

Figure 5:
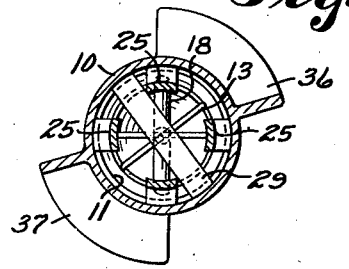
Figure 5 is a similar section taken on line 5—5 of Figure 2.
Figure 6:
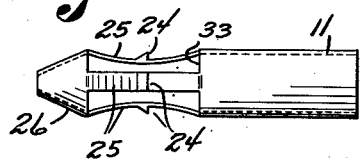
Figure 6 is a detail showing the inner sliding cylinder with gripping dogs thereof in the contracted positions.
Figure 7:
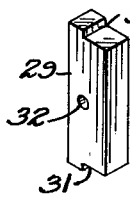
Figure 7 is a detail illustrating a cross bar or wedge by which the end of the spring is attached to the cylinder.

The spring 13 is attached to the cylinder 11 by a cross bar or wedge 29, the length of which is equal to the outside diameter of the cylinder 11 and the bar 29 is provided with shoulders 30 and 31 which correspond with the inside diameter of the cylinder 11 whereby with the end of the spring 13 secured in an opening 32 in the bar the bar is wedged against the forward end 33 of the cylinder 11 with the ends positioned between the spring members 25, as illustrated in Figure 5.

With the parts arranged in this manner a fish hook 34 on the end of a leader 35, the inner part of which extends through the stem 28 of the plunger 12, is drawn outwardly with the cylinder 11 in the position shown in Figure 3 and with the cylinder gripped by the thumb and forefinger of a hand the plunger 12 is forced inwardly by the stem 28 whereby the spring strips 29 are expanded to the position shown in Figure 3 so that the gripping dogs 24 engage the ring 22. The parts remain in this position with the spring 13 extended until a fish strikes the hook whereby the plunger 12 is drawn forwardly to release the spring strips holding the dogs 24 and with the dogs released from the ring 22 the spring 13 snaps the plunger and hook whereby the fish is positively hooked or secured on the hook.

The outer surface of the tubular casing 10 is provided with spirally positioned fins 36 and 37 which cause the actuator to turn or spin as it is drawn through the water.

It will be understood that modifications may be made in the design and arrangement of the parts without departing from the spirit of the invention.

What is claimed is:

1. A fish hook snap actuator comprising a tubular casing having openings in the sides thereof, a cylinder having gripping dogs thereon slidably mounted in the casing, said cylinder being positioned to be gripped through the openings of the casing, a plunger positioned in the cylinder for expanding the said dogs to gripping relation with the casing, a spring in the casing with one end attached to the cylinder and the other to the casing, means attaching a fish hook to the plunger, and means attaching a fishing line to the casing.

2. A fish hook snap actuator comprising a tubular casing having openings in the sides thereof, a cylinder having gripping dogs thereon slidably mounted in the casing, said cylinder being positioned to be gripped through the openings of the casing, a plunger positioned in the cylinder for expanding the said dogs to gripping relation with the casing, a spring in the casing with one end attached to the cylinder and the other to the casing, means attaching a fish hook to the plunger, and means attaching a fishing line to the casing, said tubular casing having a cap with a conical shaped end on the end thereof in which the plunger is positioned and said cylinder and plunger having correspondingly shaped ends with the said ends positioned to nest in the conical shaped end of the cap whereby force applied to the plunger releases the gripping dogs and the plunger and cylinder are retracted by the spring.

3. A fish hook snap actuator comprising a tubular casing having openings in the sides thereof, a cylinder having gripping dogs thereon slidably mounted in the casing, said cylinder being positioned to be gripped through the openings of the casing, a plunger positioned in the cylinder for expanding the said dogs to gripping relation with the casing, a spring positioned in the casing with one end attached to the end of the casing opposite to that in which the plunger and cylinder are positioned, a cross bar wedged in the cylinder and to which an end of the spring is attached, means attaching a fish hook to the plunger, and means attaching a fishing line to the casing.

4. A fish hook snap actuator comprising a tubular casing having openings in the sides thereof, a cylinder having gripping dogs on spaced spring strips therein slidably mounted in the casing, said cylinder being positioned to be gripped through the openings of the casing, a plunger positioned in the cylinder for expanding the said dogs to gripping relation with the casing, a spring in the casing with one end attached to the cylinder and the other to the casing, means attaching a fish hook to the plunger, and means attaching a fishing line to the casing.

ARCHIE D. ROSE.

REFERENCES CITED

The following references are of record in the file of this patent:

UNITED STATES PATENTS

| Number | Name | Date |
| --- | --- | --- |
| 1,614,931 | Pennell | Jan. 18, 1927 |
| 2,147,917 | Noren | Feb. 21, 1939 |
| 2,524,224 | Gunser | Oct. 3, 1950 |
| 2,530,007 | Euzent | Nov. 14, 1950 |

FOREIGN PATENTS

| Number | Country | Date |
| --- | --- | --- |
| 710,595 | France | Aug. 25, 1931 |